US 6,623,080 B2

(12) United States Patent
Clapper

(10) Patent No.: US 6,623,080 B2
(45) Date of Patent: Sep. 23, 2003

(54) CELLULAR CUSHION VEHICLE SEAT SYSTEM

(75) Inventor: Dennis L. Clapper, Swansea, IL (US)

(73) Assignee: Roho, Inc., Belleville, IL (US)

( * ) Notice: Subject to any disclaimer, the term of this patent is extended or adjusted under 35 U.S.C. 154(b) by 0 days.

(21) Appl. No.: 10/158,311

(22) Filed: May 30, 2002

(65) Prior Publication Data

US 2003/0030319 A1 Feb. 13, 2003

Related U.S. Application Data

(60) Provisional application No. 60/311,206, filed on Aug. 9, 2001.

(51) Int. Cl.[7] ............................................. A47C 27/10
(52) U.S. Cl. ...................... 297/452.41; 5/655.3; 5/710
(58) Field of Search ...................... 297/284.3, 452.41; 5/654, 655.3, 710, 713

(56) References Cited

U.S. PATENT DOCUMENTS

| | | |
|---|---|---|
| 562,606 A | 6/1896 | Henry |
| 3,525,549 A | 8/1970 | Knabusch et al. |
| 3,870,450 A | 3/1975 | Graebe |
| 4,005,236 A | 1/1977 | Graebe |
| 4,541,136 A | 9/1985 | Graebe |
| 4,698,864 A | 10/1987 | Graebe |
| 5,007,676 A | 4/1991 | Lien |
| 5,029,939 A * | 7/1991 | Smith et al. .............. 297/284.1 |
| 5,035,016 A * | 7/1991 | Mori et al. ..................... 5/713 |
| 5,052,068 A | 10/1991 | Graebe |
| 5,152,023 A | 10/1992 | Graebe |
| 5,163,196 A | 11/1992 | Graebe et al. |
| 5,193,237 A | 3/1993 | Holdredge |
| 5,265,933 A | 11/1993 | Croshaw |
| 5,269,589 A | 12/1993 | Brothers et al. |
| 5,369,828 A | 12/1994 | Graebe |
| 5,419,612 A * | 5/1995 | Rassekhi ................ 297/452.41 |
| 5,487,197 A * | 1/1996 | Iskra et al. ............ 297/452.41 |
| 5,538,326 A | 7/1996 | Lorbiecki |
| 5,561,875 A | 10/1996 | Graebe |
| 5,596,781 A | 1/1997 | Graebe |
| 5,715,695 A | 2/1998 | Lord |
| 5,749,111 A | 5/1998 | Pearce |
| 5,839,140 A * | 11/1998 | Wilkerson ..................... 5/654 |
| 5,994,450 A | 11/1999 | Pearce |
| 6,026,527 A | 2/2000 | Pearce |
| 6,122,785 A * | 9/2000 | Bondie et al. ................. 5/709 |
| RE37,026 E | 1/2001 | Whalen |
| 6,413,458 B1 | 7/2002 | Pearce |

\* cited by examiner

Primary Examiner—Peter R. Brown
(74) Attorney, Agent, or Firm—Polster, Lieder, Woodruff & Lucchesi, L.C.

(57) ABSTRACT

An improved vehicle seat assembly for mounting on the frame of a vehicle driver's seat including a polymer support plate attached to the frame, a polyurethane foam base on the support, an inflatable air cell cushion on the base and an elastic cover. The inflatable air cell cushion includes individual inflation zones each comprised of individual interconnected inflation cells. The zones are normally isolated from each other. A center zone having a preset inflation pressure is positioned under the ischial area of the driver. Front, back and side bolster zones provide front-to-back and side-to-side support. The individual air cells of the center zone are interconnected by a serpentine airflow path of reduced area to enhance the vibration and shock absorption characteristics of the zone.

21 Claims, 5 Drawing Sheets

CELLULAR CUSHION VEHICLE SEAT SYSTEM

REFERENCE TO RELATED APPLICATIONS

This application claims priority to provisional application Serial No. 60/311,206, filed Aug. 9, 2001.

STATEMENT REGARDING FEDERALLY SPONSORED RESEARCH OR DEVELOPMENT

Not Applicable.

BACKGROUND OF THE INVENTION

The invention relates generally to an improved vehicle truck seat assembly that provides support and shock dampening to the ischial area of the driver as well as front-to-back and lateral stabilization. The seat assembly employs an inflatable air cell cushion with a central inflation zone comprised of individual inflation cells interconnected by an airflow path that provide optimum shock absorption qualities. Bolster zones comprised of individual air cells surround the central inflation zone. The inflation cells have a cell geometry that allows for improved molding of a support cushion comprised of individual fluted or finned cells.

Truck drivers seated for long periods of time in the cab of a truck can suffer discomfort caused by pressure, road shock and vibration. It has been shown that persons who are required to stay seated for long periods of time, for example, long haul truck drivers, experience muscle fatigue, loss of flexibility and back pain, particularly due to truck vibrations transmitted to the driver. Any driver discomfort, soreness or numbness in the buttocks and legs, can be attributed to a loss of blood flow in the tissue from unrelieved pressure on the skin. Besides creating physiological problems, this discomfort may require the driver to make frequent stops or shorter trips, decreasing efficiency.

Inflatable cellular cushions provide the most uniform distribution of weight and thus provide the greatest protection from seating pressure. These cushions have an array of closely spaced air cells that project upwardly from a common base. Within the base the air cells communicate with each other, and thus, all exist at the same internal pressure. Hence, each air cell exerts essentially the same restoring force against the buttocks, irrespective of the extent to which it is deflected. U.S. Pat. No. 4,541,136 shows a cellular cushion for use on wheelchairs.

U.S. Pat. No. 3,870,450 illustrates another cushion design and discloses a conventional method and apparatus for molding and assembling the cushions. U.S. Pat. No. 3,870,450 and U.S. Pat. No. 4,005,236 disclose fluted cells. The cells are spaced apart to prevent material that is in the soft or uncured condition from the dipping process from bridging adjacent cells during forming. U.S. Pat. No. 4,541,136 provides a multicell cushion in which the individual cells have a finned configuration when deflated. This cell configuration allows the cells to contact each other along their sides when inflated to provide a continuous supporting surface.

Generally fluted or finned cells have a higher profile than vacuum molding will allow. That is, to vacuum mold, you would pull the material into the mold to fill out the form stretching it and causing it to thin out and become weak. The thin areas cool off too quickly and can break. This can be avoided with dip molding. Due to the cost, dip-molding methods generally are used to make cushions having individual cells of identical configurations and support characteristics.

Heretofore, molded inflatable air cell cushion technology has been directed to medical uses, such as wheelchair cushions or mattress overlays for compromised patients, and has not been optimally employed in seating for vehicles, such as trucks. Although such cellular cushions work well for preventing pressure sores, they have not necessarily addressed the problems associated with able-bodied vehicle drivers, such as vibration and shock to the ischial area and front-to-back and side-to-side stabilization.

It would be advantageous, therefore, to provide vehicular seating that addresses the problems of pressure, vibration, road shock and stabilization utilizing inflatable air cell technology. It also would be advantageous to develop a vehicular seating assembly incorporating an improved inflatable cellular cushions which can be installed in the vehicle and controlled by the driver that improves seating comfort for these drivers.

It also would be advantageous to vacuum mold plastics to form finned cushion cells. Labor costs are less for vacuum molding. Vacuum molding would allow a manufacturer to make cushions having varied finned cell configurations and arrangements. Thus, cushions could be custom made to fit the anatomy of individual truck drivers.

SUMMARY OF THE INVENTION

One aspect of the invention is a seat assembly for a vehicle having enhanced vibration and shock absorption characteristics.

Another aspect of the invention is a seat assembly for a vehicle having enhanced front-to-back and side-to-side stabilization characteristics.

Another aspect of the invention is an improved cushion for use in a vehicle that provides improved seating comfort for the user, particularly drivers who sit for extended periods of time, such as over-the-road truck drivers.

Another aspect of this invention is an improved cushion cell geometry that allows for vacuum molding a finned cushion from urethane or other plastic.

According to the invention, briefly stated, an improved truck seat assembly incorporating an improved inflatable air cell cushion is provided. The inflatable air cushion includes a plurality of inflation zones comprised of individual cells. For example, one such cushion includes five zones. One zone of cells is located approximately at the middle of the cushion to be positioned under the ischial area of the driver. There are four zones comprised around the perimeter of the cushion to function as bolsters. The cushion can be mounted on a relatively solid base or a foam base that can be attached to a seat support plate. A flexible plastic seat support plate allows the truck seat pan to dampen truck vibrations and shock loads. mounted on the frame of the original truck seat. The support, the base and the air cell cushion provide desired road vibration absorption characteristics. In another embodiment, a support fabric supports the base and the air cell cushion. The tension on the fabric can be adjusted to obtain optimal support and vibration dampening characteristics.

The peripheral zones are connected by valve and air lines through an air regulator to the truck's air supply system to control air pressure in the peripheral zones. The driver can adjust the pressure in the peripheral zones for seating comfort and lateral support or the cushion can be completely automatic and fit to the driver. The air regulator is pre-set to provide optimal pressure to the ischial zone.

In another embodiment of the invention sensors, such as a bottom out sensor or "smart fabric" is used to cover the cushion. The "smart fabric" is used to determine pressures in various and, through a feedback loop to the air supply, adjust the air pressure.

Also provided is an improved cushion with individual inflation cells having an improved cell geometry that provides optimal support characteristics with manufacturing advantages. The novel cell has an optimum ratio of area of the cell to area of the base (footprint) is 3:1 which allows for vacuum molding. For example, in one embodiment the cushion cell has a 2.5-inch by 2.5-inch (6.25 square inch) base or footprint and a surface area of 18.75 square inches or less. Vacuum molding is less expensive than dip molding and, therefore, making it commercially and economically feasible to provide multiple variations of cushion configurations.

DESCRIPTION OF THE PREFERRED EMBODIMENT

Figure 1:
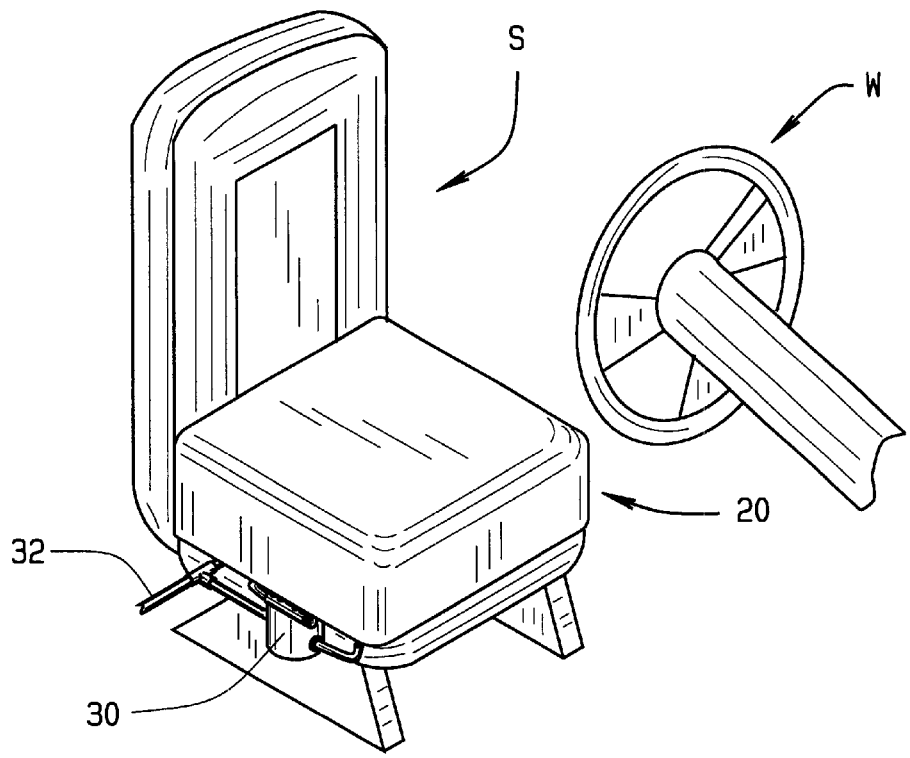
FIG. 1 is a perspective view of a truck seat including novel seat cushion assembly of the present invention.

One embodiment of a novel seat cushion assembly of the present invention, indicated generally by assembly 20 is shown in FIG. 1 is employed as the seat cushion of a truck seat S in the cab or driver's area of a truck. It will be understood that the seat cushion assembly 20 can be provided as part of a truck seat as original equipment (OEM) or can be used to replace a conventional or OEM seat cushion. As shown, the illustrated embodiment is a seat cushion 20 is designed for use in a vehicle for seating and support of a driver, particularly a driver who sits in a driver's seat behind a steering wheel W for extended periods of time, such as a truck driver. The cushion assembly can be used in any vehicle, however.

Figure 2:
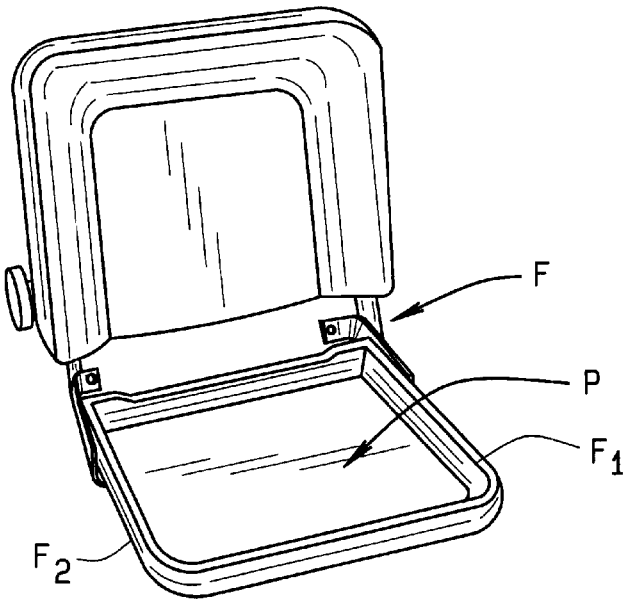
FIG. 2 is a perspective view of a truck seat with the seat section frame exposed.
Figure 3:
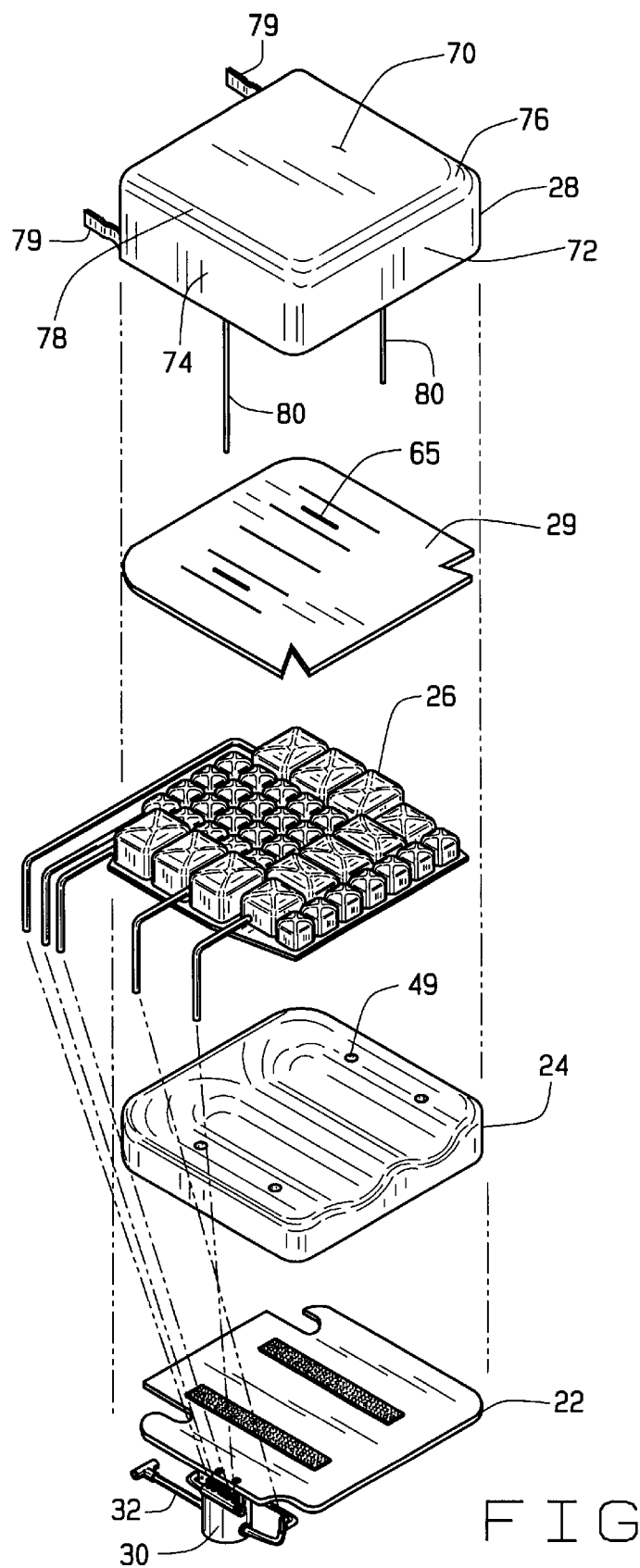
FIG. 3 is an exploded view of the seat cushion assembly of the present invention.

As seen from FIG. 3, in general, the assembly 20 includes a seat frame support 22, a base 24 secured to the seat base support, an inflatable air cell cushion 26 on the seat base, and a cover 28, generally having a pad 29 interposed between the cover and the seat cushion cells. Assembly 20 is designed to mount on the seat frame as will be explained. Generally, a truck seat frame includes a suspension member between lateral frame elements, F1 and F2, as shown in FIG. 2. In conventional truck seats the suspension member is a metal pan P. However, one aspect of the invention is an improved support that replaces the conventional pan P and cooperates with the seat base and air cell cushion of the present invention to provide improved seating characteristics.

Figure 6:
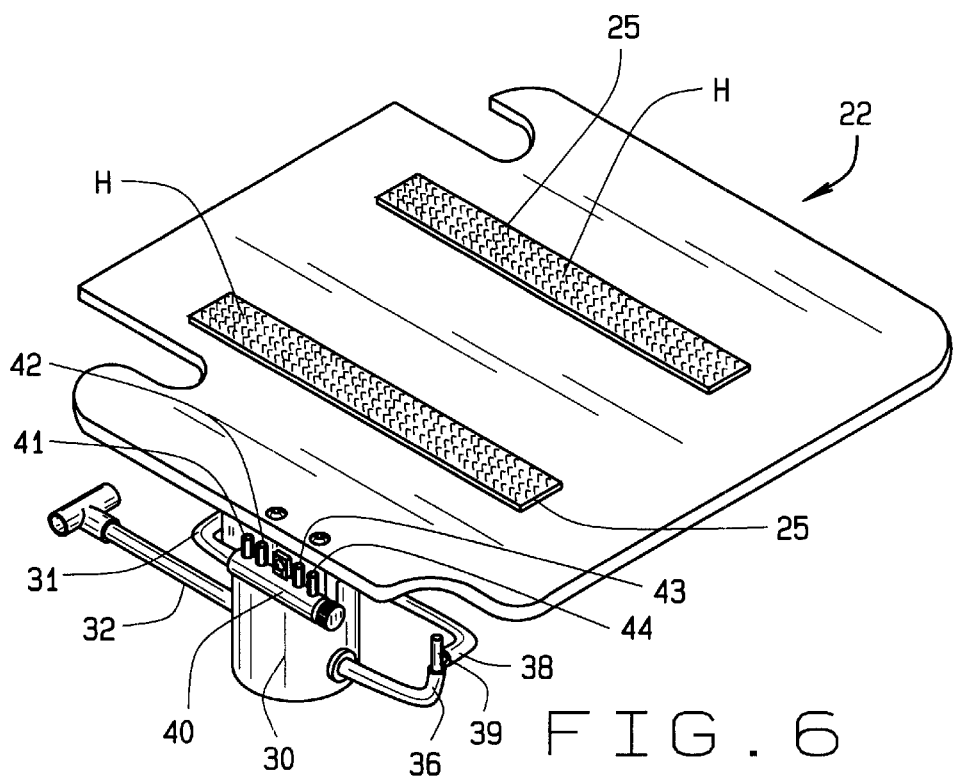
FIG. 6 is a perspective view of the seat support plate.

Seat support plate 22, as illustrated in FIG. 6, is a resilient and flexible polymer sheet that is properly dimension and configured to suspend between the lateral frame elements F1 and F2 of the truck seat frame F in place of or in conjunction with pan P and appropriately conform to the seat back and frame to allow all elements of the truck seat S to properly function. The resilient and somewhat flexible nature of the support 22 adds to the road shock dampening capability of the seat cushion assembly. Varying the thickness or composition of the sheet can vary the flexibility and shock dampening qualities of the support. The support 22 has two spaced apart parallel strips of hook and loop fastener 25 such as Velcro® glued or otherwise attached to the support, with the hook side H exposed.

In alternative embodiments of the support, other materials may be used in place of any seat pan. For example, a supportive fabric, such as a fabric like Gemstone® by Milliken, Spartanburg, S.C., can be suspended between the lateral frame elements F1 and F2 and properly tensioned for optimal support and vibration control or absorption characteristics. These characteristics can be adjusted by adjusting the tension of the stretched fabric. When a material such as fabric is employed, the base 24 can be attached to the fabric. Alternatively, the inflatable air cell cushion 26 can be attached, for example by RF welding, directly to the fabric or otherwise appropriately secured. Also, the original seat pan P can be utilized with seat base 24 and air cell cushion 26 if it is determined that the original seat pan provides appropriate support characteristics for the intended use. Preferably, however, support 22 or a support fabric is used.

An air regulator 30 is attached to a peripheral edge of support 22 by a bracket 31. In the illustrated embodiment, regulator 30 is a conventional air pressure relief regulator. Regulator 30 can be pre-set to provide an appropriate air pressure, as will be explained below. An air supply line 32 extends from regulator 30 and has a fitting 34 for fluid attachment to an air source, preferably an air source in the truck, such as the air-ride truck seat or other source of pressurized air.

A first section of flexible air supply line 36 exits regulator 30 and is connected to a T-shaped connector 38. In the illustrated embodiment the air lines are flexible rubber or neoprene hoses, but any appropriate conduit can be used. T-shaped connector 38 has a center connection 39 for attachment of air supply line that extends directly between regulator 30 and the ischial support zone of the air cell cushion. A second section of air supply line 36 extends between the T-connector and a valve 40. Valve 40, in the illustrated embodiment, is a slide valve conveniently positioned so that it can be hand operated by a seated driver to adjust air flow in the bolster sections. Valve 40 is constructed similarly to, and functions like, a slide valve disclosed in co-pending application Ser. No. 10/052,101 filed Jan. 17, 2002, owned by a common assignee, and which is incorporated herein by reference. The illustrated valve is referred to as an ISOFLO™ valve (Roho, Inc., Belleville, Ill.). In any event, valve 40 has four connections 41, 42, 43, 44 for fluid connection to four separate air supply lines, each of the lines being in fluid communication with a peripheral inflation zone of air cell cushion 26. As explained below, the peripheral inflation zones normally are isolated and not in fluid communication with each other. However, since each zone is fluidly connected to valve 40, the valve is constructed so that in an open position, the peripheral inflation zones are in fluid communication through valve 40.

In addition to the single preset regulator and ISOFLO™ valve arrangement illustrated in the drawings, the inventor contemplates alternative configurations and assemblies. For example, the seat assembly could employ a preset air regulator for the ischial zone and separately adjustable regulators for each bolster zone; a present regulator for the ischial zone and rocker-type inflation/deflation control valve for each of the bolster zones; preset air regulator for the ischial zone and the bolster zones with check valves in the air lines to the bolster zones to prevent back flow and pressure-relief valves in the air lines to the bolsters to relieve pressure greater than a desired pressure; adjustable air regulators for each zone combined with an ISOFLO™ valve; an air source directly to the air cell cushion with an ISOFLO™ valve to control pressure into each zone, or a straight air flow into the cushion and a simple inflation valve The relationship between the valve, air supply lines and cushion inflation zones will be explained in detail below in reference to the detailed description of air cell cushion 26.

Figure 5A:
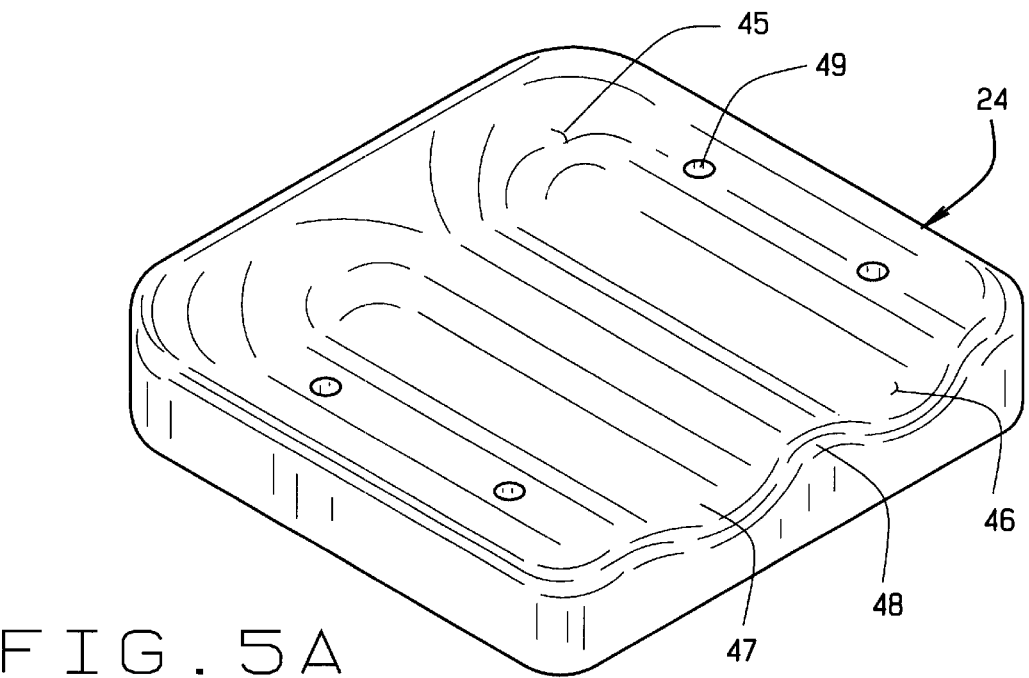
FIG. 5A is perspective view of an orthotic foam base for the seat cushion assembly of the present invention.
Figure 5B:
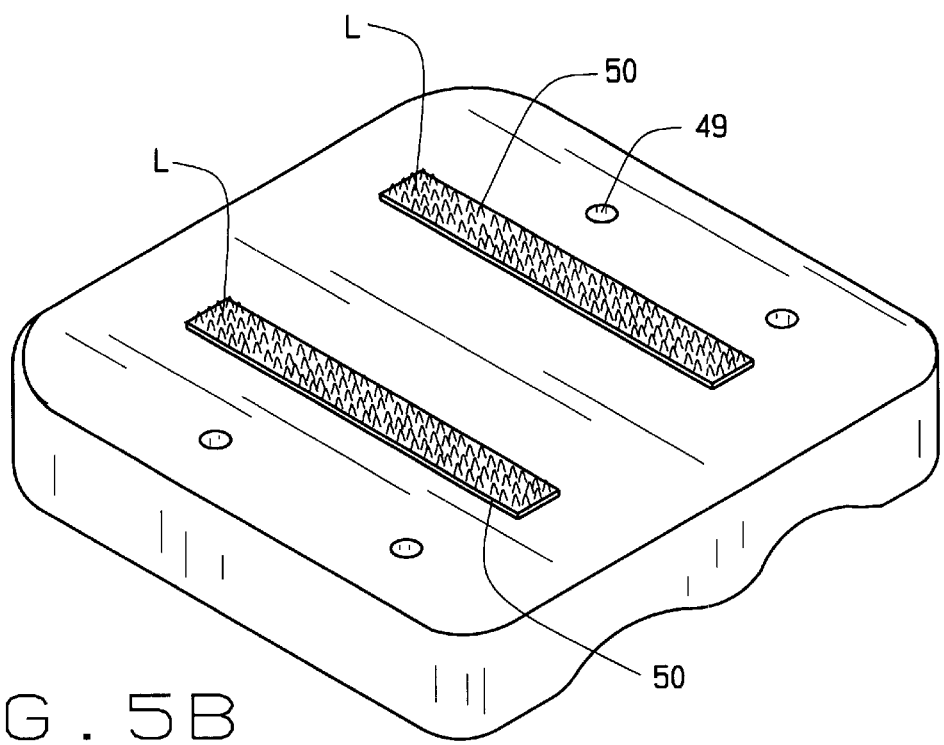
FIG. 5B is a bottom plan view thereof.

A seat base 24 that suitably supports and secures the inflatable cell cushion is attached to the support 22 and is chosen for its support characteristics as well as its vibration dampening qualities. FIGS. 5A and 5B illustrates an orthotic foam base 24 for a seat cushion of the present invention. Base 24 is suitably formed to provide support for the inflatable cushion in an anatomically acceptable configuration. As seen in FIG. 5A, base has a size and peripheral configuration complementary to that of support 22. Base 24 has a substantial material thickness and is designed to have support as well as vibration and shock absorbing characteristics. Base 24 includes an anatomically correct rear depression 45 suitable for support of the buttocks of the driver. Base 24 also includes and defined leg troughs 46 and 47. A pommel 48 separates the leg troughs and is designed to separate and support the legs. Holes 49 are formed through the material thickness of the base for attachment of the cover, as will be described below.

The bottom surface of base 24, as seen in FIG. 5B includes spaced apart, parallel strips 50 of hook and loop fastener, with the loop side L, exposed. Strips 50 are positioned to be in alignment with strips 25 on support 22 when the base is appropriately positioned and mounted on the support 22. The complementary hook and loop fastener strips 25 and 50 secure the base 24 to the support 22. The base 24 also can be removed from the support by disengaging the hook and loop fastener strips, if desired. Preferably base 24 is molded from open cell polyurethane. During the molding process, strips 50 are placed with the hook side down on the uncured polyurethane material. As the polyurethane cures, the hooks are integrated into the polyurethane to form a nearly unbreakable bond between the strips 50 and the base 24.

Although described as molded from polyurethane, base 24 can be constructed from other materials depending upon the desired shock dampening and support qualities desired. Bases constructed of harder materials, such as wood, can be employed. Hard plastic or fiberglass or combinations of materials also can be used. In the event materials other than the open cell polyurethane are used, strips 50 would be suitably attached to the bottom surface by gluing or other means.

An inflatable cellular cushion 26 is mounted on the seat base 24. In general, the inflatable cellular cushion is comprised of an array of individual inflation cells that, when properly inflated, cooperate to form a supportive seating surface. Generally speaking, the cushion includes a base with multiplicity of air cells projecting from the base generally parallel to each other. The air cells conventionally are dip molded from a rubber material, such as neoprene, using a mold having a flat base and spaced apart upstanding mandrels. This molding process yields an array of cells with a web between the air cells, commonly referred to as a conformal. The backing, sometimes referred to as the sealing layer, is formed at the same time the air cell layer is being dipped. The opposite side of the flat base of the mold is used to dip mold the backing simultaneously with the conformal. The backing then is attached to the web of the conformal with adhesive, such as glue, to form a cushion base. U.S. Pat. No. 3,870,450, which is incorporated herein by reference illustrates discloses a preferred method and apparatus for dip molding and assembling the cushions from neoprene.

Figure 4:
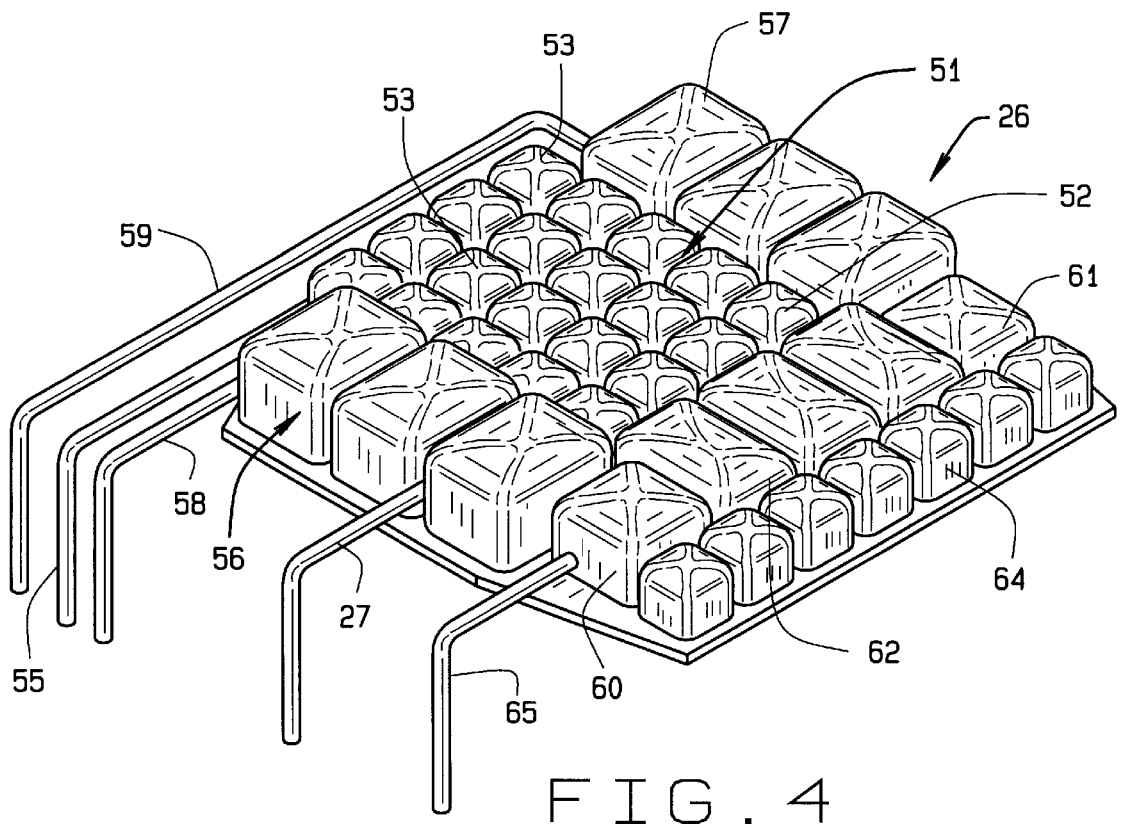
FIG. 4 is a perspective view of the air cell cushion.
Figure 7:
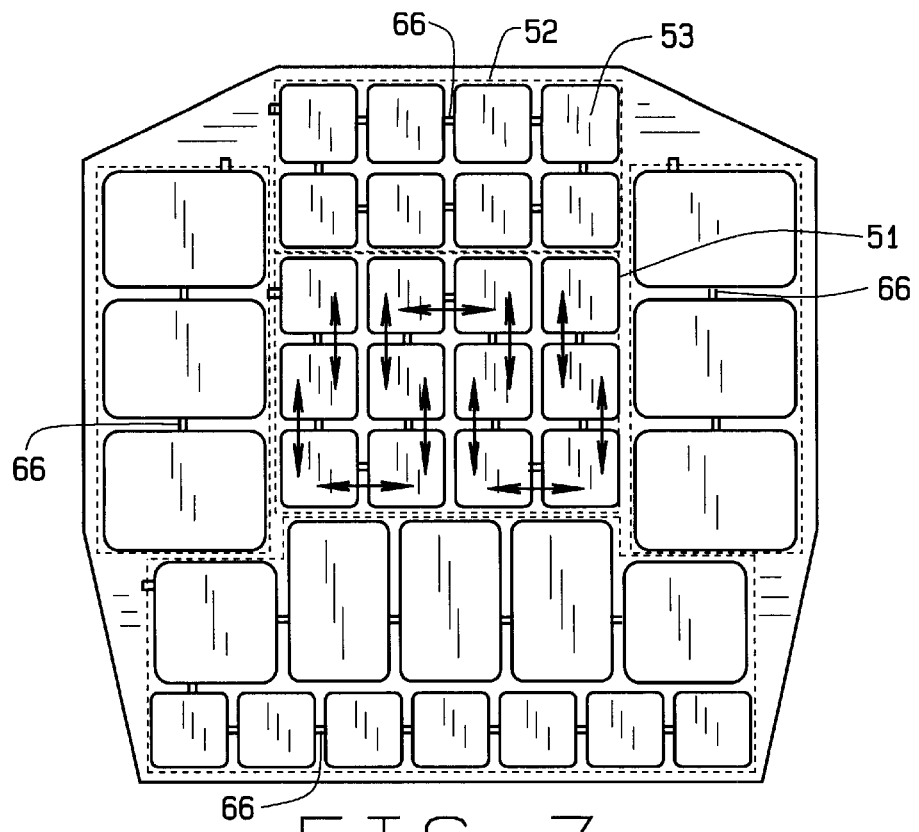
FIG. 7 is a schematic illustrating inflation zones of one embodiment of an air cell cushion of the present invention.

As shown in FIG. 4 and corresponding schematic FIG. 7, one exemplary embodiment includes a separate center inflation zone, or ischial support zone 51, comprised of three (3) rows of individual cells 52 of uniform configuration. Ischial support zone 51 is designed to be located under the ischial area of the seated driver and the cells are constructed to function as shock absorbers to dampen road shock to the ischial area. The cells of the zone 51 generally are inflated to a predetermined pressure by preset regulator 30 to optimally support the ischial region of the driver and function to absorb road shock. Zone 51 is connected to T connection 39 by air line 27.

Zone 51, in the illustrated embodiment, is surrounded by four separate perimeter inflation zones. As shown, at the rear edge of zone 51 are two rows of cells 53 having the same general configuration and dimensions as cells 52. The two rows of cells 53 comprise a rear support zone 54 or bolster and are connected to the manifold by air line 55. On one side of zone 51 is a row of three larger cells 56 or uniform dimension. A row of corresponding cells 57 is aligned on the opposite side of zone 51 Cells 56 and 57 each comprise respective inflation zones or side bolsters. These side inflation zones are connected to valve 40 by air lines 58 and 59, respectively. Immediately adjacent cells 56 and 57 are smaller cells 60 and 61, respectively. Between cells 60 and 61 is a row of somewhat longer cells 62.

Across the front end of the cushion is a row of small cells 64. This front row of smaller cells 64 allows the driver's thighs to extend over the edge of the cushion with optimal comfort. Cells 60, 61, 62 and 64 comprise a front inflation zone or bolster. The front support zone is connected to the manifold by tubing 65. Each individual inflation zone is discrete and not in fluid communication with any other zone. These recited perimeter zones around the ischial support zone are optimally designed and positioned to provide lateral and front to back support for the driver. It will be appreciated that cushion 26 includes an ischial zone, but can include any desired number and arrangement or configuration of bolsters, depending upon the size of the truck seat, the driver, and desired support characteristics. The illustrated cushion 26 is one exemplary embodiment the inventor has determined works well.

Figure 8:
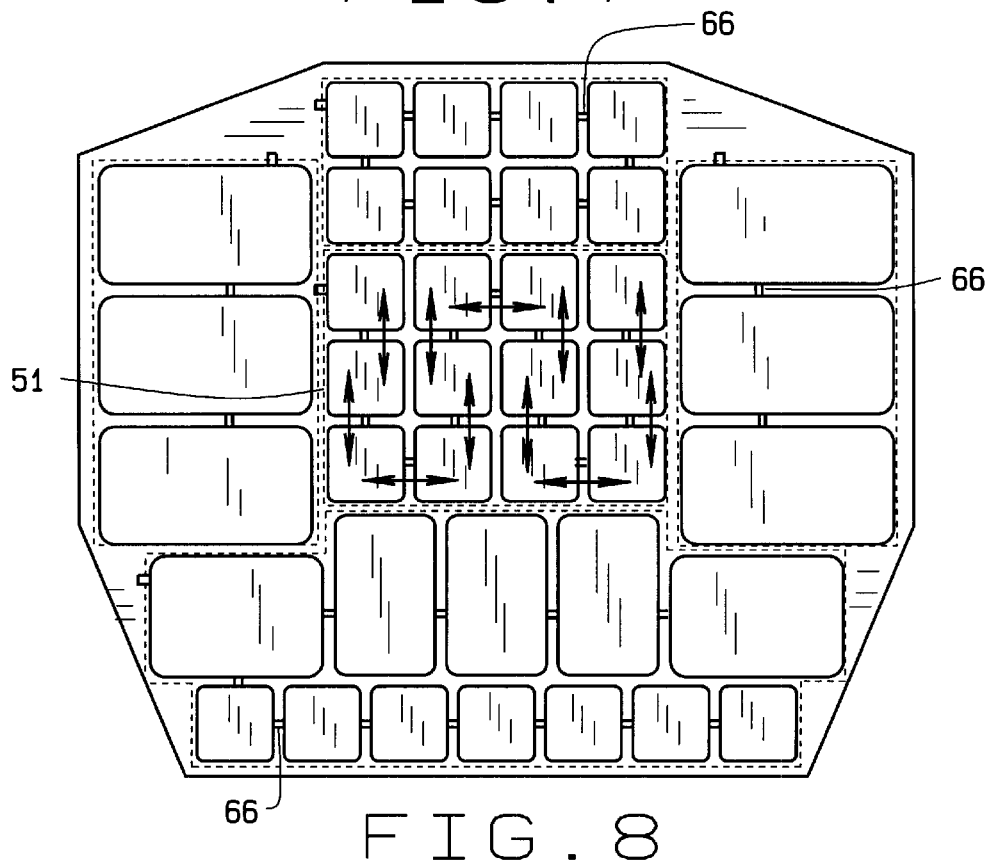
FIG. 8 is a schematic illustrating inflation zones of another embodiment of a cushion of the present invention.

As best seen in FIGS. 7 and 8, the cells within a given zone are fluidly interconnected by channels, indicated generally by number 66. These channels, rendered patent by the placement of gaskets in the cushion assembly process, allow air to move from cell to cell within a zone. Consequently, with within each zone, flow paths interconnect the individual cells. The size of the channels and the fluid flow path configuration contribute to the shock absorbing qualities of the cushion cells, particularly in ischial zone 51. In the preferred embodiment, air channels 66 within the ischial support zone are formed with ⅛ inch gaskets; the gaskets between cells in the peripheral bolster zones are formed with ¼ inch gaskets. Because the channels 66 between cells the ischial zone 51 are smaller, airflow between individual cells is dampened or slowed when pressure is applied, contributing to the shock absorber quality of the cells.

FIG. 7 illustrates the airflow pattern of the cushion shown in FIG. 4. FIG. 8 illustrates the airflow pattern of a cushion having a broader expanse than the cushion of FIGS. 4 and 7, and is intended for use with larger truck seats or larger, heavier drivers and is included to illustrate the versatility of the instant design. The airflow principles and shock dampening qualities of the two designs of cushions essentially are the same and illustrate the enhanced the shock absorber effect of the ischial zones of air cell cushions of the present invention.

The ischial support zone 51 is connected by air line 27 to the T connector and directly into preset regulator 30. The air pressure in the ischial zone generally is preset by a knowledgeable professional such as the cushion manufacturer to provide optimum support for that critical area of the anatomy. For example, the pressure is maintained at 40 mm Hg±5 mm Hg. Further, referring to FIGS. 7 and 8, as indicated by the arrows, the air flow pattern between the cells in ischial zone 51 is in a serpentine-type pattern, which distinctly affects the rate at which air is exchanged between cells within the zone in response to pressure changes. This flow pattern, along with the diameter of channels 66, provides the optimal rate of air flow between cells within the ischial zone to allow the cells to function to absorb road shock and bounce and protect the ischial area.

It will be noted that each individual cell of the cushion, i.e., cells 52, 56, 60 and so on, irregardless of the volume or peripheral configuration, is a four finned collapsible cell and has a draw ratio of no greater than 3:1. That is, the surface area of the cell is not greater that three (3) times the area of the base of the cell, which also is referred to as the cell's foot print. For example, in a cell having a base of 2 inches by 2 inches, or 4 square inches, the surface area of the cell itself, if flattened out, would not exceed 12 inches (e.g. 3×4=12). A draw ratio, also referred to as an aspect ratio, of greater that 3:1 results in thinning out of the cell during vacuum molding. Thin areas can fail under pressure.

Consequently, the optimum cell geometry provides a four fin, foldable cell which has a cell area to base ratio of 3:1 or less (draw ratio of 3:1) The foldable aspect of the cell is important in that it allows the cells to be spaced far enough apart to facilitate molding and to provide a reasonable amount surface area between the cells to permit solid bonding of top of the cushion to the bottom later. The foldable four-fin design allows the cells to expand when inflated until they touch forming a continuous support surface.

Generally cushion 26 is dip molded from neoprene, as explained above. On the other hand, the draw ratio allows the cushions to be vacuum molded from a plastic material with the cells closer together than when dip molding and while avoiding thinning. Vacuum molding of plastic materials is simpler and less expensive than dip molding of neoprene. The cell geometry allows cells of any configuration to be vacuum molded, making individual seat cushions of differing cell configurations commercially feasible. The cell designs allow for pre-contoured seating surface that can be achieved by using different sizes and heights of cells.

Padding, such as foam layer 29, is placed over the top of the cells to smooth out the seating surface. The padding can include spaced apart slits or openings 65. A cover 28 encloses the padding, cellular cushion and base. The padding 29 can be incorporated into the cover. Cover 28 includes a top panel 70 and a front panel 72 and opposed side panels 74 and 76, which are joined to the top panel along stitch lines 78. Top panel 70 is dimensioned to match the general shape of the cellular cushion. Preferably, at least the top panel is formed from a highly elastic fabric, i.e., one that stretches in any direction. The elasticity of the top panel allows that panel to conform to the shape of the driver's buttocks when the driver sits on the seat. The cover does not detract from the utility of the air cells.

The front and side cover panels are of equal height and correspond to the height of the inflated cellular cushion 26 and base 24. The rear of the cover can be devoid of a panel or otherwise be substantially open so that the top, side and front panels can be slipped over the cushion and base and secured in place, by ties 79, snaps, hook and loop fastener or any appropriate means. Any such arrangement for securing the cover is acceptable. Also, the inside surface of the cover can have cords 80 or the like that extend through the slits 65 of the padding 29, through openings (not shown) in the cushion web and through holes 49 in base 24 to be tied together or otherwise secured under base 24 to keep the cover, padding, air cell cushion and base securely together. Cover 28 is only one exemplary embodiment of a cover. Any cover that allows optimal functioning of the air cell cushion and base, that is aesthetically pleasing, durable and comfortable, is included within the scope of the invention.

In use, the driver sits on the truck seat with valve 40 open. The peripheral zones are inflated through the regulator. As stated above, when the valve 40 is open, the individual bolster zones are in fluid communication with each other through valve 40. The seated driver then positions himself on the seat, allowing air flow between the bolsters through the valve until the bolsters are appropriately inflated and positioned with respect to the buttocks and legs so as to provide comfortable and optimal side-to-side and back-to-back support. The valve 40 then is closed. Because each zone is isolated from the other by the closed valve, pressure within each zone remains unchanged, even in response to changes in external pressure.

The pressure in ischial zone 51 is preset and maintained at its optimum support pressure by regulator 30. If during use the driver desires to change the position, feel or support of the bolsters, he can open valve 40, reposition to taste, and then close the manifold. The driver can set the pressure to provide optimum lateral or front to back support, depending on the driver's anatomy. For example, a thinner driver may increase the pressure in the peripheral zones to cradle the buttocks and provide stability. A heavier driver may decrease the pressure. In any event, the adjustability of the peripheral zones is an important feature of the seat assembly in that it allows the driver to be supported, limiting side-to-side and front-to-back shifting caused by turning, bumps, stopping and so forth, which adds to driver safety and comfort. Further, because the ischial area, as well as the thighs and hips are optimally positioned and support, the driver is less prone to stiffness, pain, muscle fatigue and numbness.

Other embodiments of the present invention are contemplated. For example, a cushion 26 can be equipped with sensors, for example a bottom out sensors, through a feedback loop to the air source to maintain an optimum pressure, the use of a "smart fabric" for covering the seat cushion is contemplated. Such a "smart fabric" has capacitance sensing elements formed therein. Milliken, Spartanburg, S.C., is developing such a "smart fabric".

It will be appreciated by those skilled in the art that vacuum molding of cushions with cell having the foldable four fin design and a draw ratio no greater that 3:1 makes custom truck seat building commercially feasible. This important aspect of the invention will allow truck manufacturers, for example, to assemble drivers' seats that are custom designed to accommodate any trucker's special seating needs. The novel principles of the present invention are applied to any vehicle seat including, but not limited to, automobiles, light trucks, construction equipment, boats, airplanes, buses, trains or the like. Consequently, changes to or modifications of the illustrated embodiments are intended to be within the scope of the appended claims.

What is claimed is:

1. A vehicular seat assembly for the seating of a vehicle driver or use with a vehicular seat frame comprising:
    a resilient seat base for attachment to the seat frame;
    an inflatable cellular cushion attached to the top surface of the resilient seat base, said inflatable cellular cushion having a plurality of individual inflatable cells, said plurality of individual inflatable cells arranged in a plurality of individual inflation zones, at least one of said plurality of individual inflation zones positioned adjacent a center line of the seat base to align under and support of an ischial area of a driver seated on the cushion and including an airflow path among the individual cells within the inflation zone comprised of patent airflow channels between individual inflatable cells arranged in a substantially continuous serpentine airflow path among the individual cells so as to restrict free airflow along the airflow path and facilitate dampening of vibration and road shock in that zone, and at least one other of the plurality individual inflation zones positioned along an edge of the seat base to provide peripheral support to the driver; and
    apparatus for controlling the inflation of the inflatable cellular cushion comprising an air source and an air regulator.

2. The vehicular seat assembly of claim 1 further comprising a slide valve between the regulator and the individual inflation zones, said slide valve comprising a connector in fluid communication with each inflation zone wherein said valve allows fluid communication between individual inflation zones through the valve when the valve is in an open position and to prevent fluid communication between individual inflation zones through the valve when the valve is in closed position to maintain a desired pressure in each of the inflation zones after the vehicle driver is appropriately positioned on the seat assembly.

3. The vehicular seat assembly of claim 2 further comprising pressure sensing means connected between the inflatable cellular cushion and the air source wherein the pressure sensing means actuates the air source to maintain a predetermined pressure within the inflatable cushion.

4. An improved truck seat assembly comprising:
    a seat frame for mounting in a driver area of a truck, said seat frame including a support member;
    an inflatable cellular cushion on said support member, said inflatable cellular cushion assembly comprising a plurality of individual inflatable cells, said plurality of individual cells arranged into at least one center ischial support zone having a continuous internal serpentine air flow path for dampening airflow among cells in the center ischial support zone and individual peripheral support zones adjacent said ischial support zone;
    an original air source in the truck fluidly connected to said center support zone and said individual lateral support zones; and
    a regulator between the original air source and the inflatable cellular cushion for regulating a desired air pressure within said recited zones.

5. The improved truck seat assembly of claim 4 wherein the inflatable cushion assembly further comprises a resilient seat base between said inflatable cellular cushion and said support member.

6. The improved truck seat assembly of claim 5 wherein said resilient seat base is a molded polyurethane foam seat base.

7. The improved truck seat assembly of claim 4 wherein said support member is a polymer material.

8. The improved truck seat assembly of claim 4 wherein said support member is a supportive fabric.

9. The improved truck seat assembly of claim 4 further comprising four peripheral support zones positioned around said center ischial support zone, two of said peripheral support zones providing forward and rearward seating stability and two of said peripheral support zones providing lateral seating stability for a driver seated on said truck seat assembly.

10. An improved vibration and road shock dampening vehicle seat assembly for a seat frame in the driver area of a vehicle, comprising:
    a seat support on the seat frame;
    a resilient seat base on said seat support;
    an inflatable cellular cushion on said seat base, said cushion having a plurality of individual hollow inflatable cells divided into a plurality of discrete inflation zones, at least one of said discrete inflation zones being substantially centrally positioned on the seat base so as to align under an ischial area of a driver seated on the seat assembly, the centrally positioned discrete inflation zone having an internal continuous and substantially serpentine fluid flow path among the hollow cells to dampen vibration and road shock to the ischial area of the driver, with at least two other of said plurality of discrete inflation zones being positioned on the periphery of the base;
    at least one air regulator between the inflatable cellular cushion and an air source; and
    a slide valve positioned between said at least one air regulator and the inflatable cellular cushion to regulate air pressure within said discrete inflation zones.

11. The vehicle seat assembly of claim 10 wherein said resilient seat base is a foam seat base.

12. The vehicle seat assembly of claim 10 wherein said seat base is a molded foam seat base removeably attached to said seat support by hook and loop fastener wherein a section of said hook and loop fastener is molded into said molded foam seat base during a molding process.

13. The vehicle seat assembly of claim 10 wherein said slide valve is disposed to allow fluid communication between said peripheral inflation zones through the slide valve when in an open position and to prevent fluid communication between said inflation zones when in a closed position.

14. An improved vibration and road shock dampening seat assembly for mounting on a vehicular seat frame, comprising:
    a support member attached to the seat frame;
    a resilient seat base removeably attached to said support member;
    an inflatable cellular cushion positioned on said seat base, said inflatable cellular comprising a plurality of individual, hollow inflatable cells divided into a center inflation zone, a front inflation zone, a back inflation zone, a first side inflation zone and a second side inflation zone, said recited center inflation zone including a continuous internal fluid flow path among the individual hollow inflatable cells to control fluid flow among the cells in the center inflation zone to dampen vibration and road shock to a driver seated on the seat assembly;

a slide valve between said inflatable cellular cushion and an air source, said valve designed to allow fluid communication between said front, back, first side and second side inflation zones through the valve when in an open position and to prevent fluid communication between said last recited zones through the valve when in a closed position, whereby a driver seated on said seat assembly can adjust the inflation of said last recited zones by opening and closing said valve; and a cover.

15. The seat assembly of claim 14 wherein said support member is a polymer material.

16. The seat assembly of claim 14 wherein said seat base is a molded polyurethane foam seat base.

17. The seat assembly of claim 14 wherein said center inflation zone further comprises a preset inflation pressure of approximately 35 mM Hg to approximately 45 mM Hg.

18. The seat assembly of claim 17 further comprising an air regulator between said air source and said inflatable cellular cushion, said regulator disposed to maintain said preset inflation pressure in said center inflation zone.

19. The seat assembly of claim 14 further comprising padding between said inflatable cellular cushion and said cover.

20. The seat assembly of claim 14 wherein said cover comprises at least a top panel comprised of an elastic fabric.

21. A vibration and road shock dampening seat assembly for seating of a vehicle driver, comprising;

a seat frame support;

a cushion assembly mounted on the seat frame support, said cushion assembly comprising a resilient seat base, an inflatable cellular cushion on the seat base having a front, rear and lateral bolsters, a center inflation zone with air flow dampening means within the center inflation zone for dampening vibration and road shock, a regulator and slide valve for controlling inflation of the inflatable cellular cushion, and a cover.

* * * * *